United States Patent [19]
Bengt

[11] Patent Number: 5,941,093
[45] Date of Patent: Aug. 24, 1999

[54] SORPTION DEVICE

[75] Inventor: Ebbeson Bengt, Ettenhausen, Switzerland

[73] Assignee: Electrolux Leisure Appliances AG, Frauenfeld, Switzerland

[21] Appl. No.: 08/913,452

[22] PCT Filed: Dec. 29, 1995

[86] PCT No.: PCT/EP95/05166

§ 371 Date: Feb. 17, 1998

§ 102(e) Date: Feb. 17, 1998

[87] PCT Pub. No.: WO97/24564

PCT Pub. Date: Jul. 10, 1997

[51] Int. Cl.[6] ................................................ F25B 15/00
[52] U.S. Cl. ................................................ 62/478; 62/480
[58] Field of Search ............................ 62/476, 478, 480, 62/477, 106

[56] References Cited

U.S. PATENT DOCUMENTS

| | | | |
|---|---|---|---|
| 4,169,362 | 10/1979 | Weil et al. ............................... | 62/478 |
| 4,478,057 | 10/1984 | Lotz ........................................ | 62/480 |
| 5,279,359 | 1/1994 | Erickson ............................ | 165/104.12 |
| 5,408,847 | 4/1995 | Erickson ................................ | 62/478 |
| 5,503,222 | 4/1996 | Dunne .............................. | 165/104.12 |

FOREIGN PATENT DOCUMENTS

| | | |
|---|---|---|
| 151237 | 8/1985 | European Pat. Off. . |
| 590443 | 4/1994 | European Pat. Off. . |
| 3229646 | 2/1984 | Germany . |
| 94/00721 | 1/1994 | WIPO . |

*Primary Examiner*—William Doerrler
*Attorney, Agent, or Firm*—Pearne, Gordon, McCoy & Granger LLP

[57] ABSTRACT

In a sorption device with orbiting sorption containers (16) and a heat transfer medium radially flowing therearound, the individual flow regions are mutually sealed by lips (36) resting against outer and/or inner margins, respectively, of the sorption containers. The sorption containers include a heater absorber part and a condensation-evaporation part. As heating device for the heat transfer medium flowing around the heater absorber parts, a heating tube (40) which transfers the heat using ribs (41) to the heat transfer medium can be used.

45 Claims, 6 Drawing Sheets

SORPTION DEVICE

BACKGROUND OF THE INVENTION

The invention relates to a sorption device as defined for use in a cooling system.

A sorption device of that kind is known from EP 0 590 443 A1. Using such sorption devices, heat can be transferred from a first heat carrier to a second heat carrier which is on higher temperature. Therein, a working substance is exothermally absorbed in a sorption agent and again is desorbed in an endothermic reaction. Thus it is possible to extract heat from a condensation evaporation part by cooling a heated heater absorber part down close to ambient temperature and by subsequent heating in excess of ambient temperature and to make use of said condensation evaporation part e.g. for cooling an air stream.

In the known sorption device, the housing enclosing the heater absorber parts comprises only one inlet and one outlet for the gaseous carrier medium which on its flow path extracts heat from as well as supplies heat to the heater absorber parts. The heat carrier medium—usually air—therein is guided through the housing in a direction opposite to the direction of rotation of the sorption containers and alternatingly flows along the heater absorber parts radially from outside to inside and from inside to outside. For guiding the heat carrier medium axially extending webs are provided for which reach up to the outer and inner orbit of the sorption containers and are mutually displaced on the inside and outside.

The known sorption means works with an efficiency very good for such devices, in particular when the sorption substances contained in the sorption containers consist of zeolite and water and the sorption containers, as provided for in the preferred embodiment of the known device, are formed as elongated flat hollow bodies and are bent in cross-section. When using zeolite for absorbing water no excessively high pressure is created in the sorption containers, permitting design of the sorption containers with comparatively large outer surfaces. If the sorption containers, however, contain ammonia changing from liquid into gaseous state of aggregation and vice versa, as well as one or several different salts absorbing the ammonia, then higher pressure exists in the sorption containers. The known sorption containers designed with a profile similar to a wing profile are not very well suitable for receiving higher pressures, since the surface is too large as compared to the cross-sectional area. Seen from the technical point of view, the use of a circular cross-section is best. Therein, few pipes having a larger diameter produce a better economical relation than many tubes with smaller diameter, as weight can be reduced. However, efficiency is more favorable when using many small tubes, so that an optimum has to be found for each individual case.

In the device cited in the beginning obligatorily a small gap exists between the webs and the outer and/or inner edge, respectively, of the sorption containers, through which gap a small portion of the heat carrier medium can move to the adjacent room instead of taking the provided path radially passing between the sorption containers. This short-cut flow can be neglected in the known device, as it is of no importance because of the plurality of sorption containers, in particular since the gap continually is covered by two sorption containers at least. If, however, fewer sorption containers are provided for with larger circumferential distance, in the known device a no longer negligible amount of heat carrier medium can pass through the webs and the margins of the sorption containers, this causing a noticeable worsening of efficiency.

In the known sorption device in addition the means for heating the gaseous heat carrier medium is built by a burner, preferably a gas burner, which is arranged in the housing enclosing the heater absorber parts. The combustion gases produced by the burner are admixed to the heat carrier medium and thus increase the volume thereof The amount of heat carrier medium introduced into the housing must be dimensioned correspondingly so that in the flow area located in front of the burner a smaller amount of gas having correspondingly lower flow velocity is present. Thereby the exchangeable amount of heat and the efficiency to be obtained are limited.

SUMMARY OF THE INVENTION

The present invention is based on the object of improving efficiency of the sorption means cited in the beginning and to increase the amount of heat to be exchanged between the sorption containers and the heat carrier medium in particular.

It is of importance that the annular gap between the rotating sorption bodies and the housing parts is sealed efficiently. Therein, different methods are proposed as being preferred, wherein on one hand the housing parts are stationary and only the rotor with the sorption containers rotates, whereas on the other hand the housing parts adjacent to the rotor are built as rotatable ring members which step by step move together with the rotor and slide back after a short phase of standstill. It may also be provided for that the rotor moves past the fixed housing parts step by step and gas passage takes place in the standstill phase.

It is guaranteed by the arrangement of lips in the flow channels, reaching till to the margins of the sorption containers that the heat carrier medium is guided radially from inside to the outside completely and vice versa, so that no transfer losses can occur.

The lips can either be arranged fixedly and bend upon propagating sorption container until they snap back and lie onto the margin of the next following sorption container. In a preferred embodiment, however, they also can be co-moved together with the sorption containers in direction of rotation and move back after a given length of path in order to seal the next sorption container.

When the sorption containers because of the higher internal pressure are given a circular or oval cross-section, they preferably are provided with ribs for better heat transfer. The ribs extend crosswise to the longitudinal direction of the sorption containers, i.e. radially to the common axis of rotation thereof, and preferably are designed such that they form radially extending flow channels for the gaseous heat carrier medium. These flow channels each are sealed against adjacent flow channels by said lips.

The sorption containers preferably are built as tubes having circular or oval cross-section. They can each represent a continuous tube extending longitudinally, which comprises a heater absorber part on one and a condensation evaporation part on its other end.

The tubes can be arranged one beside the next on an orbit or, however, on several concentric orbits such that in radial direction several tubes are arranged from inside to outside. For example, the heater absorber parts and the condensation evaporation parts of the concentrically arranged circles of tubes can be filled with different salts. Therein, it proved to be meaningful if the heater absorber parts of the outer tube circle are filled with manganous chloride, those of the central tube circle are filled with strontium chloride and those of the inner tube circle are filled with barium chloride. Also a mixture of these three salts is preferable, the salt crystals possibly being intercalated into a basic material, like e.g. graphite material. It then is meaningful to guide the air such that the hottest air at first is guided to the heater absorber parts filled with manganous chloride and, after it cooled down somewhat, to the inner barium chloride sorption parts. Herein, it is conceivable that 3 adjacent sectors each which can be of identical construction can be passed simultaneously. It also is conceivable that the heater absorber parts lying one beside the next on a circle are filled with different salts and the tube group is moved around the rotor axis step by step.

As means for heating the gaseous heat carrier medium, a heating tube can be provided for which is arranged in parallel to the sorption containers outside of the circle of rotation thereof. The heating tube is a closed system which is partly filled with a heat carrier medium, with water in particular. During heating the water evaporates in the heating tube and distributes the heat uniformly over the entire tube and from there via ribs to its environment. The sorption containers as well as the housing accommodating them in this case are located one on top of the other.

If a burner serves for generating the heating gas, it can be arranged on the lower and/or free end, respectively, of the heating tube, adjacent to the outer wall of the housing accommodating the condensation evaporation parts.

The heating gas, e.g. the combustion gas of the burner or the exhaust gas of an IC engine is guided along the heating tube, for heating the heat carrier medium flowing into the housing for the heater absorber parts using heat exchanger ribs. The amount of heat carrier medium in this way is not increased. The exhaust gases are guided to a heat exchanger prior to exiting to the atmosphere through a chimney so that here, too, heat recovery takes place.

Within the orbiting sorption containers formed by the tube circles, at least one cross flow fan, preferably however at least four cross flow fans, is/are arranged distributed on the circumference, which fans provide for a controlled air steam in radial direction to the central axis or to the outside, respectively, so that the sorption containers are passed by the working air uniformly. Cross flow fans can, however, be arranged outside of the rotor additionally or alternatively.

According to a preferred embodiment of the present invention the core of the sorption device arranged around the axis of rotation is provided with an insulation in order to avoid that passing the core larger streams of heat are guided to the individual chambers, which would decrease efficiency.

LIST OF FIGURES

In the following the invention is explained in more detail with respect to different possible embodiments with reference to the drawing.

FIG. 8 is a cut top view onto an embodiment of the sorption device in which cross flow fans are provided for, and FIG. 9 is a perspective view of the device for heating the heat carrier medium, in which a heating tube is provided for.

DETAILED ACCOUNT OF WORKING EXAMPLE OF THE INVENTION

Figure 1:
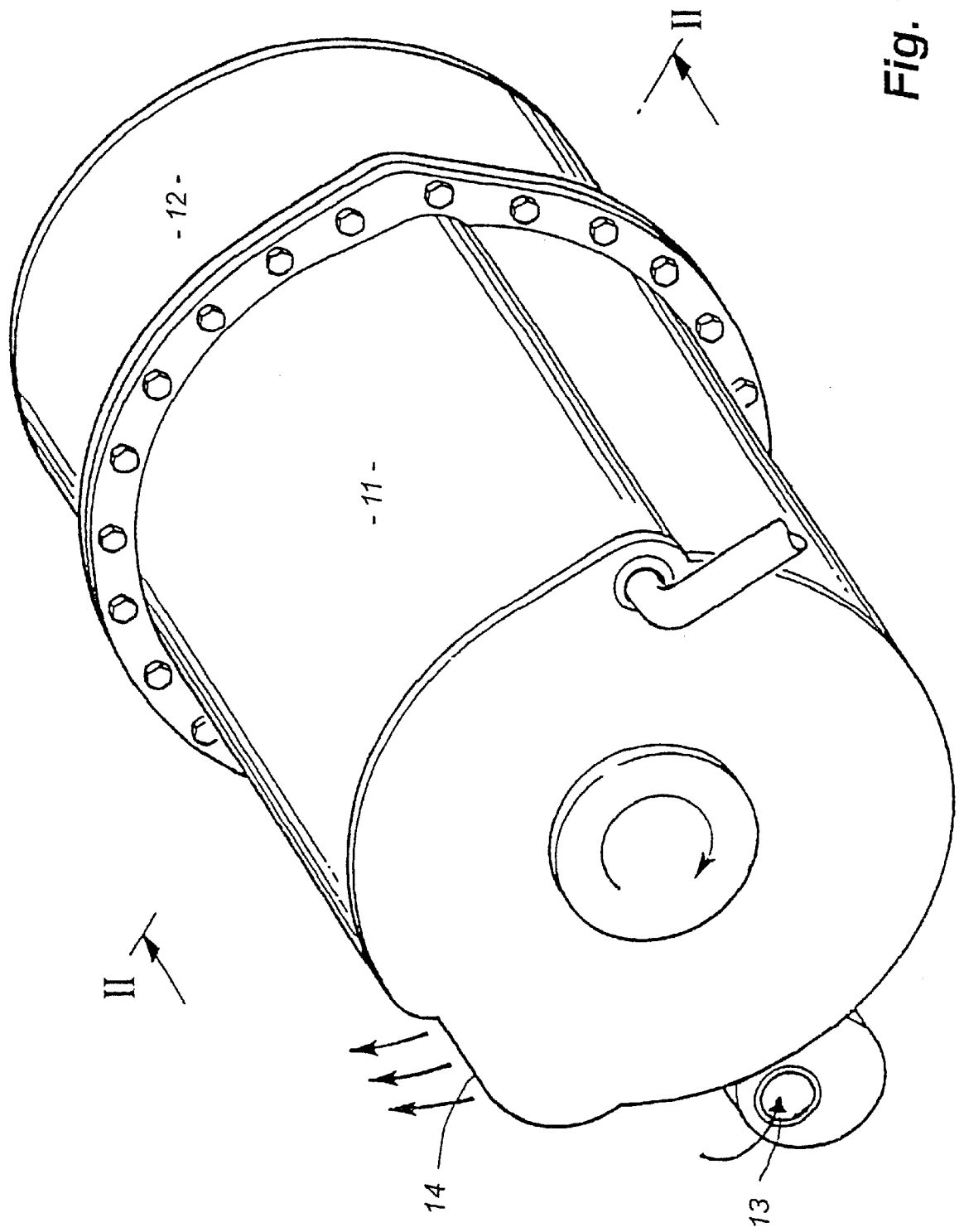
FIG. 1 is a perspective outside view of a sorption device with two housings arranged coaxially.

The sorption device in accordance with the present invention seen from the outside is constructed similarly to the known device explained in the beginning, wherein in the embodiment shown in FIG. 1 two coaxial housings are provided for of which the housing 11 accommodates the heater absorber parts of the sorption containers, while the condensation evaporation parts are located in the housing 12, as will be explained closer later, An air inlet 13 into which ambient air is sucked in by a radial fan and fed through the housing to an air outlet 14 is provided for on said housing 11. It is, however, also possible to use other kinds of ventilators, like e.g. one or several cross flow fans on the outside and/or inside of the sorption containers. In approximate radial opposition to the fan a heating means for heating the air is arranged in said housing 11.

Figure 2:
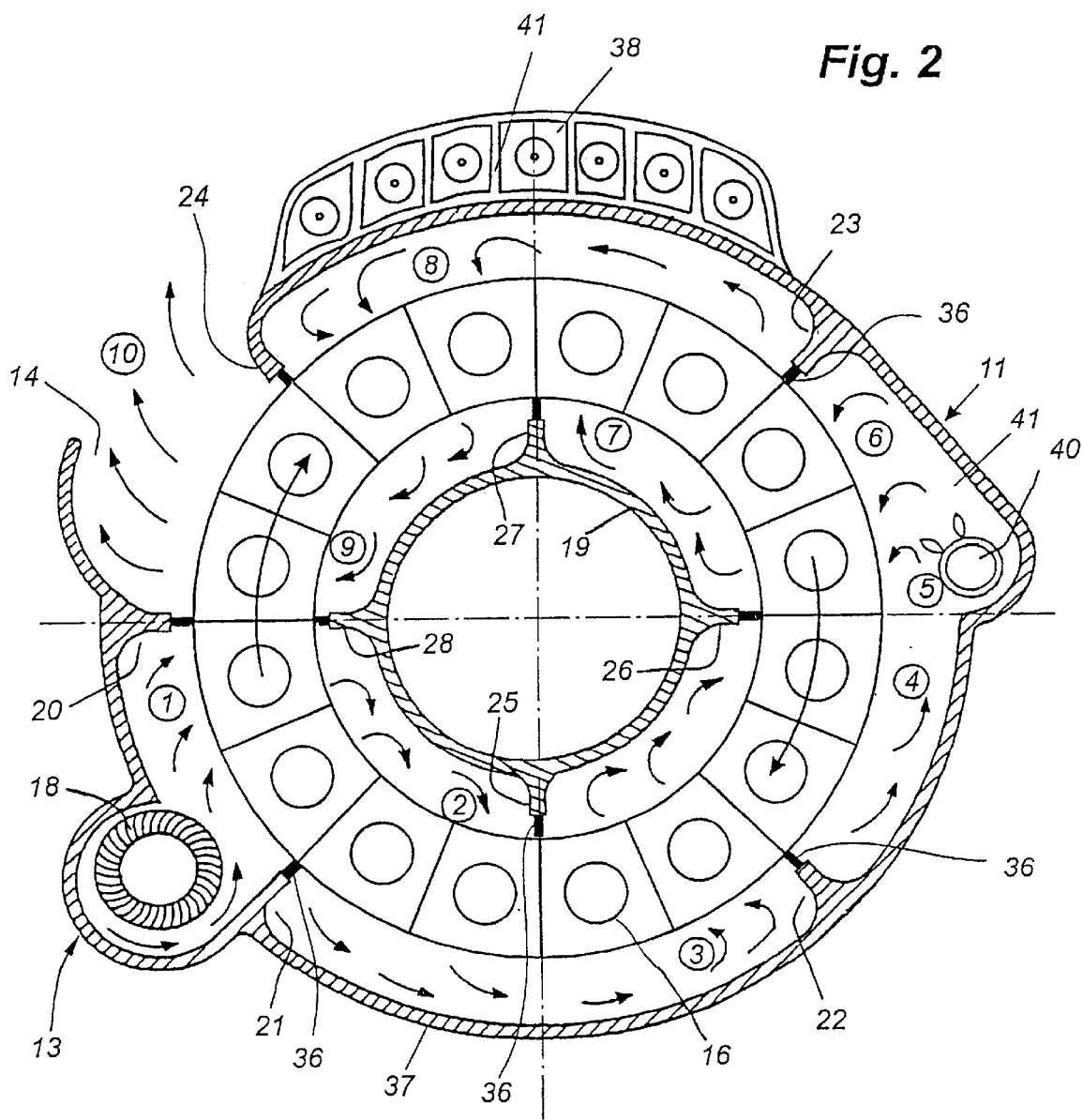
FIG. 2 is cross-section through the housing containing the heater absorber parts.

A rotor is located in the interior of the housings, said rotor axially passing through the housings and consisting of several tube-shaped sorption containers 16 which are arranged in annular neighborship with one another and in the view of FIG. 2 as entity rotate in right-hand direction. The orbiting speed therein is in the range of one rotation in two to five minutes.

Supply and diversion of heat on the external surfaces of the heater absorber parts of the sorption containers 16 is effected by an air stream entering through the air inlet 13 into the housing 11 and being conveyed by a radial fan 18. The main direction of flow of air therein runs counterclockwise. The external wall of the housing and the inside wall are spaced from the sorption containers so that flow channels extending in circumferential direction, for the air serving as heat carrier medium are created. On the external wall, webs 20, 21, 22, 23, 24 directing to the inside and extending longitudinally are formed on which the air stream is deviated radially to the inside. The inside wall comprises corresponding webs 25, 26, 27, 28 directing to the outside, which are shifted in circumferential direction with respect to the webs 20 to 24 and which guide the air stream radially to the outside.

The air stream supplied by the fan 18 takes the path indicated by arrows. It enters the housing inside in region (1) and is guided approximately radially to the inside at (1) by webs 20, 21 and again radially to the outside at (2) by web 25. Therein, it absorbs the sorption heat created in the heater absorber parts.

Subsequently, the air comes into contact with the heater absorber parts which have been heated in the desorption area. By web 22 the air is further guided at (3) to the inside and by web 25 in circumferential direction in counterclockwise direction. It therein absorbs further heat, whereas the heated heater absorber parts are cooled.

On web 26 a further deviation to the outside is effected so that the air again enters the outer flow channel at (4). At (5)

it is heated by the heating means 50 and thus reaches a higher heat level than the heater absorber parts. The hot air is guided to the inside at (6) by web 23 and again to the outside at (7) by web 27 and delivers its heat to the heater absorber parts in which thereby the sorption agent absorbed priorily is desorbed or expelled, respectively.

At (8) there is a deviation to the inside and at (9) again to the outside for final exit at (10). In the area of this flow part the air gives away its remaining heat to the heater absorber parts which leave the sorption area in cooled form and thus are preheated for desorption. Thereby, the air at outlet 14 has a temperature only slightly higher than at the inlet 13 so that in the region of the heater absorber parts only small loss of heat and thus energy occurs. When the heated air passes through the region (8), a part of the amount of heat contained in this air is given to the air passing through channel 38 by the wall of housing 11 and via ribs 41 formed in channel 38. This air can be dried in a drying means (not shown) for incoming air, located in front of housing part 11.

The sorption device in accordance with the present invention can be operated with different sorption agents. Thus, a filling of a zeolite absorbing water vapor at standard temperature can be present in the heater absorber parts so that the water contained in the condensation evaporation parts will evaporate at low temperature. The evaporation heat absorbed from the environment can herein be used for cooling air. On the other hand the sorption containers can also contain ammonia which is absorbed and again desorbed by one, two or three different salts or a mixture thereof. The sorption containers filled with ammonia therein are under higher pressure.

Thus, it is required for the sorption containers that they on one hand resist the inside pressure and must remain absolutely sealed and on the other hand are to permit the transition of amounts of heat as large as possible between their interior and the outer room. While a large wall area with low wall thickness is advantageous for good heat transfer, pressure stability require a surface as small as possible and/or a thicker wall. These contradictory demands are met by the sorption containers shown in FIGS. 2 to 4.

Figure 3:
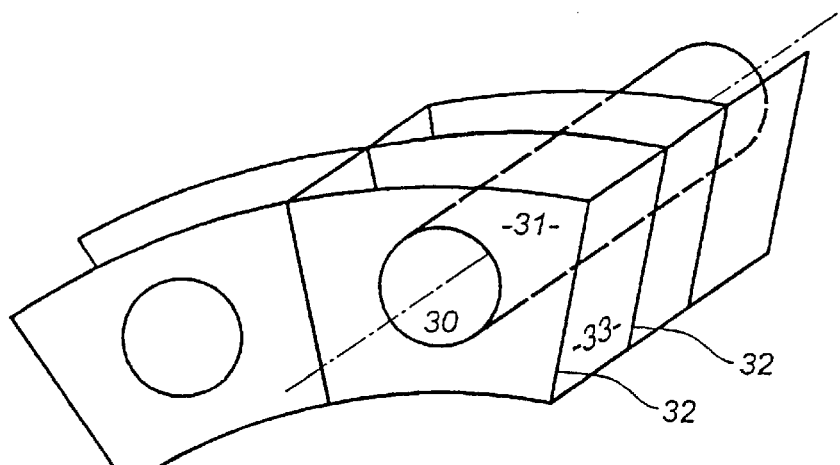
FIG. 3 is a schematical perspective partial view of a sorption container.
Figure 4:
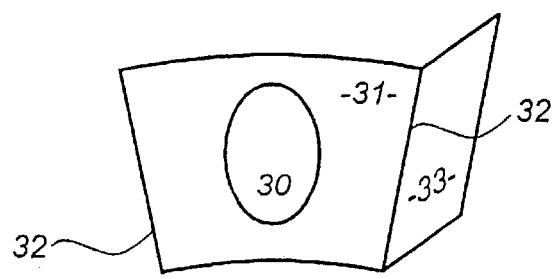
FIG. 4 is a cross-section through a further sorption container.

According to FIG. 3 each sorption container 18 is built as tube 30 which is provided with plane ribs 31 extending radially. Instead of the circular tube cross-section shown in FIG. 3, the cross-section of the tube can also be oval or elliptical, as shown in FIG. 4. The ribs 31 are arranged at uniform intervals over the entire length of tube 30.

Each rib 31 in approximation has the shape of an equilateral trapeze. The two non-parallel side edges 32 herein extend in radial direction to the common axis of rotation of all sorption containers 16. On these side edges therein one is built such that a side strip 33 is bent away from the trapezoidal area. FIG. 4 shows the original shape of the area forming the rib 31 and FIG. 3 shows the ribs with the bent side strips 33 one bearing on the other. The breadth of the side strips 33 corresponds to the mutual distance of the ribs 31 on the tube 30 so that closed flow channels are created which extend radially with respect to the common axis of rotation of the sorption containers. The top view shown in FIG. 5 reveals several flow channels which are mutually limited.

Figure 5:
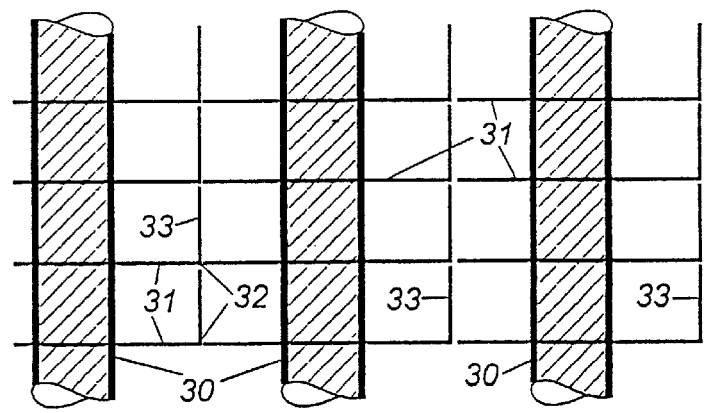
FIG. 5 is a partial view of sorption containers arranged one beside the next in radially direction seen from outside.

As the sorption containers 16 are arranged one beside the next on a circular ring, it also is sufficient if only one side edge of the trapeze forming the ribs is bent and the opposing gap between two subsequently arranged ribs is covered by the side strips of the neighboring rib. This embodiment of the ribs 31 is shown in FIG. 5.

The two parallel edges of the trapeze forming the rib 31 are not exactly straight-lined but are somewhat bent, namely with the radii of the axis of rotation common to the sorption containers. The adjacent ribs of neighboring sorption containers thus form separation walls in form of a circular disk, the bent side strips dividing off individual flow channels which are shown as rectangles in FIG. 5 extending in radial direction of each sorption container.

Webs 20 to 28 carry axially extending lips 36 on their free edges facing the sorption containers, by means of which lips the individual flow areas are separated from one another so that no heat transfer losses can occur because of air passing at the sorption containers in circumferential direction.

It is possible to form the webs themselves as lips having such breadth that they are under elastic deformation caught by the edge of the adjacent sorption container until the latter has passed the lip and it snaps back to bear on the next following sorption container.

Figure 2A:
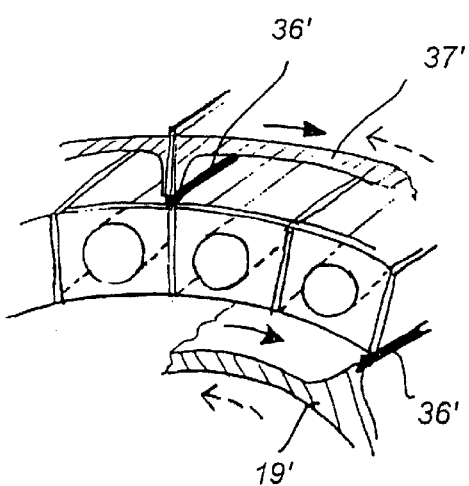
FIG. 2a is a partial section through a sorption device in which the housing parts adjacent to the rotor are built as rotatable rings.

Another possibility of permanent sealing is shown in FIG. 2a. The lips 36' and/or the webs carrying them here are located on a separate ring 37' or a sleeve supported in the housing, rotational in limited manner around the common axis of rotation of the sorption containers. In a position in which the lips 36 are aligned with the separation walls formed by the side strips 33 of ribs 31, of the flow channels, the ring 37' is rotated in the same direction and with the same speed as the sorption containers so that the lips maintain their position in respect to the ribs. When the sorption containers have further moved by the widths of a container, the ring quickly is turned back for sealing the next following flow channel at each lip. Thus, practically the entire air flowing through the housing is radially moved past the sorption containers.

An identical ring 19' can also be provided for on the inside of the sorption containers.

Figure 6:
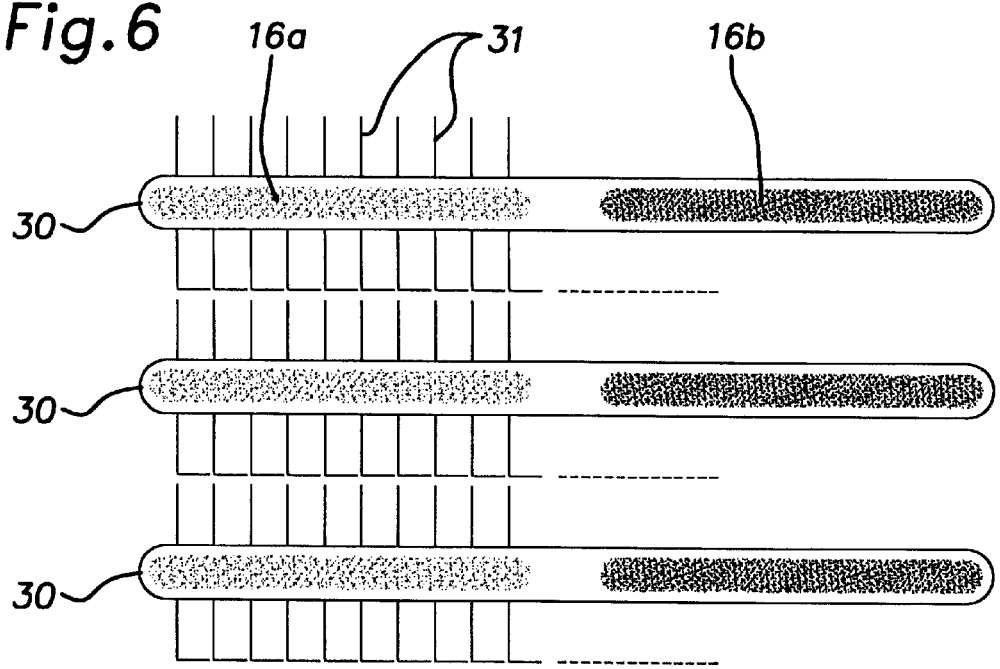
FIG. 6 is a longitudinal section though three sorption containers located one beside the next in an orbit.

As has already been mentioned, in certain embodiments working with ammonia the sorption containers have a heater absorber region and a condensation evaporation region which each contain a salt with different affinity with respect to ammonia. FIG. 6 shows such a sorption container with two tubes one lying beside the next, with the regions 16a and 16b.

Figure 7:
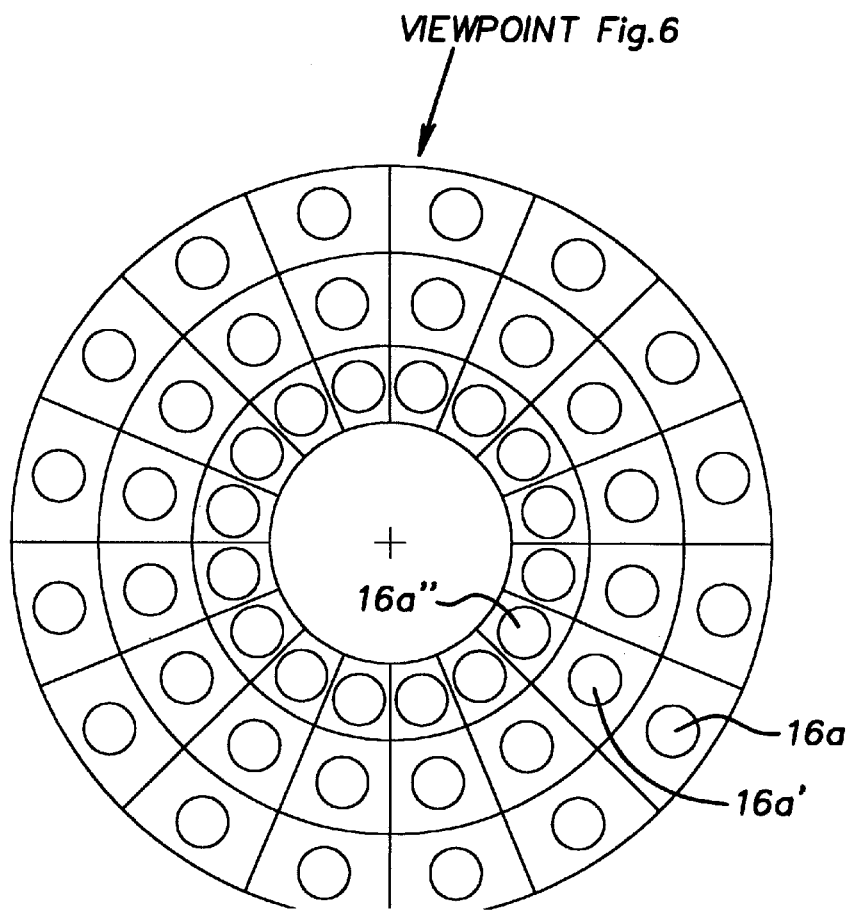
FIG. 7 is a section though a rotor with sorption containers arranged one beside the next and in radial relation to one another.

FIG. 7 shows a cross-section similar to FIG. 2 through a rotor in which two tubular sorption containers are arranged radially with respect to one another in concentric circles. In region 16a e.g. manganous chloride (high affinity to ammonia), in region 16a' strontium chloride (medium affinity to ammonia) and in region 16a" barium chloride (low affinity to ammonia) is present. Sorption containers of this construction are inserted into the device according to FIG. 1, consisting of two housings 11 and 12, regions 16a, 16a' and 16a" being located in the housing 11 and region 16b being located in housing 12.

The device for heating the flowing air in the housing enclosing the heater absorber parts can, as is known, be formed as burner. The generated combustion gases therein increase the circulating gas volume so that after the burner a larger amount of gas is present than before it. This causes a higher speed of air and a greater pressure drop so that increased pressure is required for maintaining the gas flow. This causes the disadvantage of increased leakage at the sealings between rotor and housing also in the area of the front-face housing part. Moreover, the combustion gases contain larger amounts of steam which can condensate and cause corrosion of housing parts.

Figure 8:
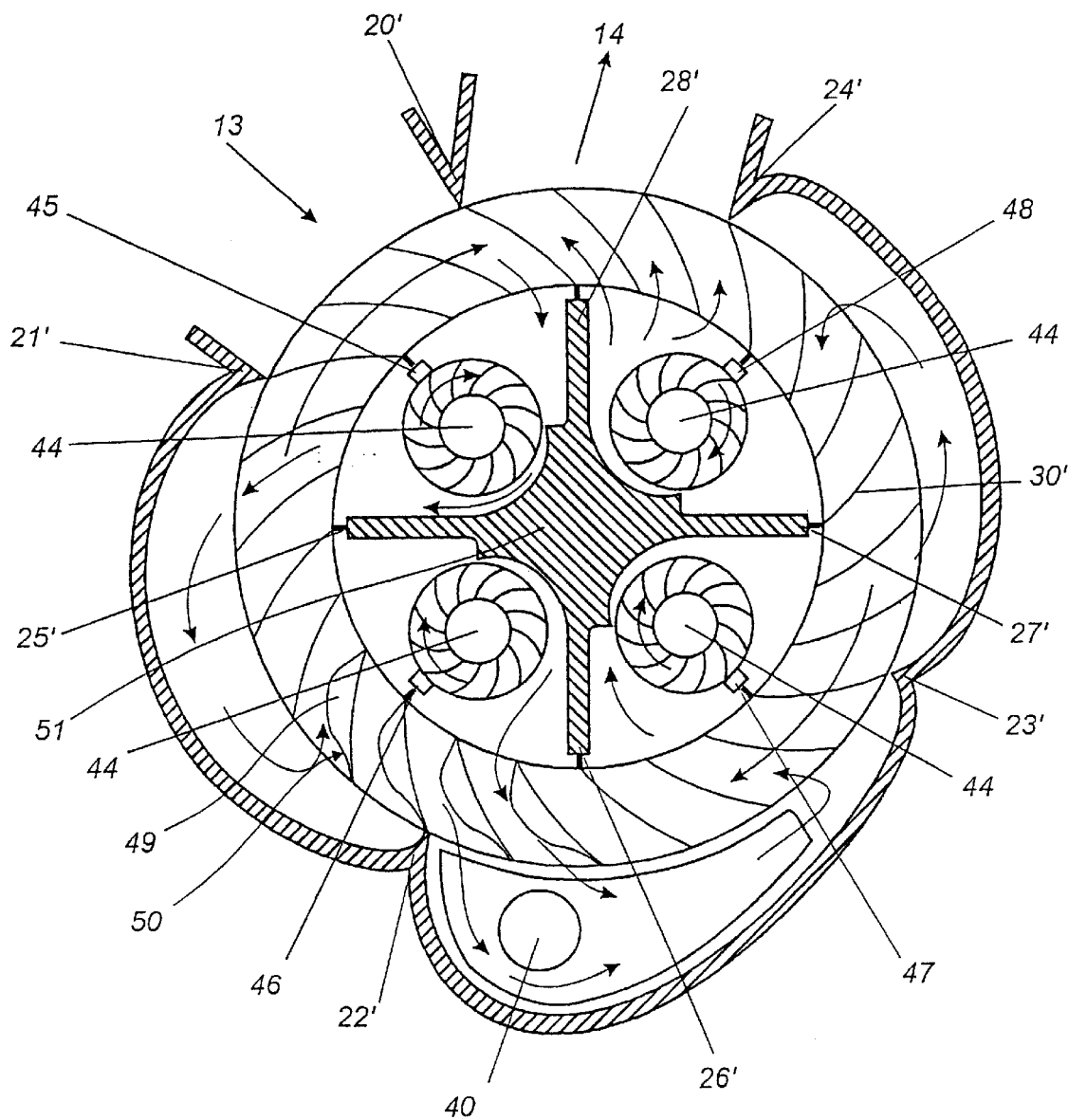
Figure 9:
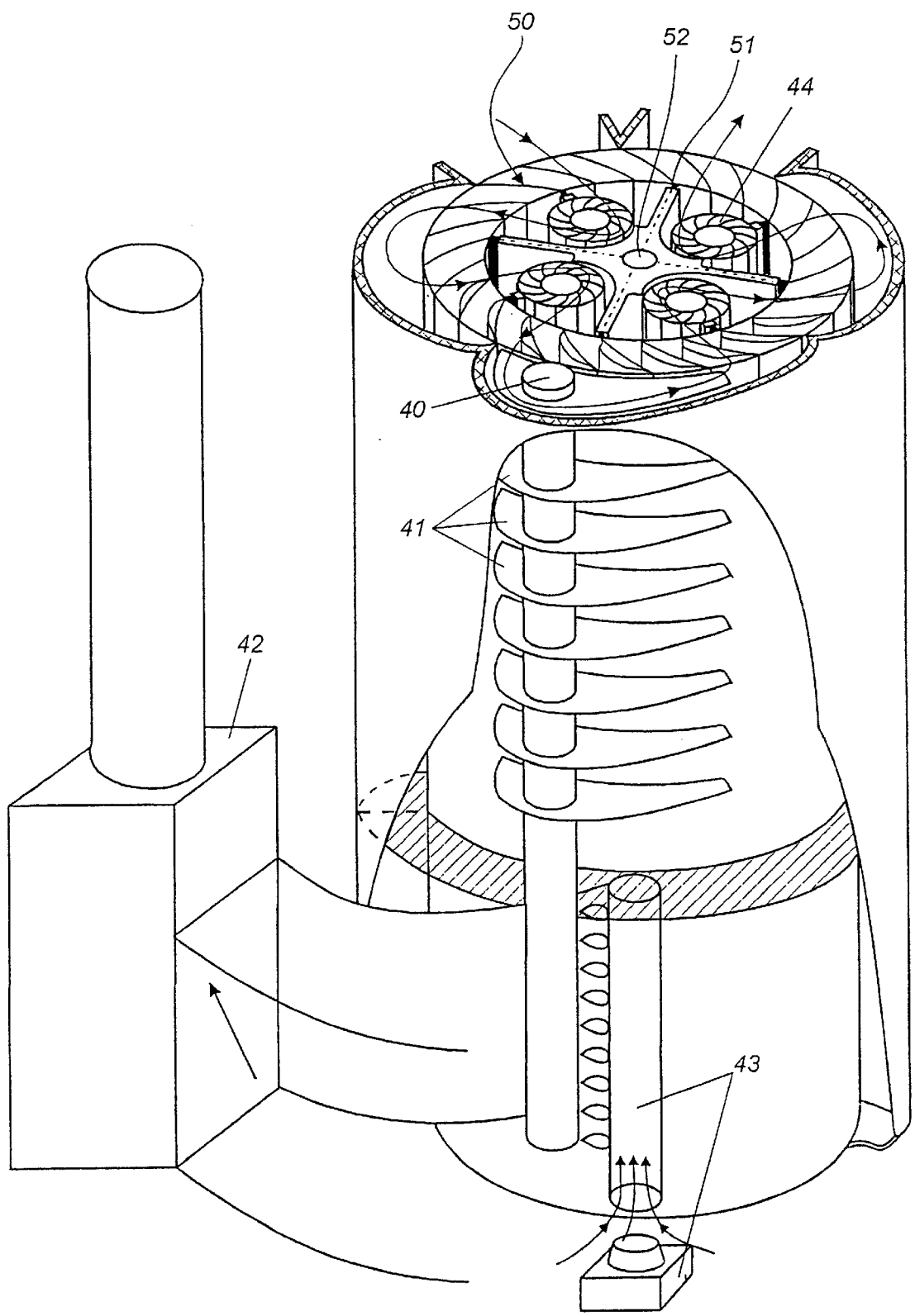

For avoiding these effects of the burner, in correspondence with FIGS. 8 and 9 a heating tube 40 may be provided for instead of a burner. The heating tube 40 is provided with ribs 41 which are located in the area (5) of the circulating air and which transfer the heat supplied by the heating tube 40 to the air.

The heat to be transferred can be introduced into the heating tube 40 in different ways. Thus, a burner separated from the device can be provided for, whose thermal energy is uniformly given away to the sorption containers via a cylinder body partly filled with a heat carrier medium. The waste heat can partly be recovered in a heat exchanger 42 for pre-heating, before the exhaust gases leave into free atmosphere.

Another possibility lies in that the heat generator is mounted in extension of the heating tube 40 on the housing 12 containing the condensation evaporation parts, which housing thus can be adapted to the outer contour of the housing 11. In this embodiment the housings 11 and 12 sensibly are arranged one on top of the other or in a position inclined with respect to vertical. The heat generator can then be built as burner 43, e.g. as gas burner, whose combustion gases slide along the heating tube 50 and therein give the heat contained therein to the air flowing around the heater absorber parts via the ribs 41.

When using the sorption device in a vehicle, it also is possible to entirely or partly guide the hot waste gases of the engine along the heating tube so that their thermal content is utilized.

For generating a uniform air stream passing between the sorption containers, several cross flow fans 44, preferably four, which are uniformly spaced on the circumference are provided for within the rotor formed by the sorption containers.

By the arrangement of several cross flow fans 44 a partial vacuum is created on the suction side of each cross flow fan 44 and a slight excess pressure is created on the pressure side. The air stream on its way through the sorption containers therein passes a saw-teeth-like pressure curve, i.e. when entering the sorption container the pressure drops slightly until the suction side of the first cross flow fan 44, then slightly increases subsequent to the cross flow fan to a higher pressure which again drops until the suction side of the next cross flow fan 44 and again is increased by the next cross flow fan 44.

The four permanently working cross flow fans 44 provide for controlled flow through the sorption device, wherein the fans can have different numbers of revolution which is correspondingly adapted to the air volume. At the air inlet 13 the air has ambient temperature and therefore still is comparatively cold. By heating of the air when passing through the heated rotor the air expands so that the second cross flow fan 44 has to cope with a greater air volume and therefore also must have a greater number of revolution. Analogous thereto also the third and the fourth cross flow fan 44 have to be adapted to the air volume to be handled. The different numbers of revolution can be obtained by belt drives with corresponding transmission rates. However, also other known forms of drive are possible.

On each of the cross flow fans 44 a fan wall 45, 46, 47 and 48 is arranged. Each fan wall 45, 46, 47 and 48 includes a sealing lip which bears on the blade-shaped tube 30'. Therein the sealings on the fan walls 25' to 28' in FIG. 8 are prepared particularly accurately, because in this area a pressure difference is produced by each cross flow fan 44 and therefore a leakage would have a particularly negative effect on the efficiency of the device. The other sealings on the outer webs 20', 21', 22', 23' and 24' as well as on the inner webs 25', 26', 27' and 28' are realized similar to that what has been explained with respect to the preceding embodiment.

When the sealing lips are supported in radially shiftable manner in the webs, a control means 52 could be provided for in the axle of the housing part 51, said control means pressing the sealings radially to the outside, e.g. when the relative velocity between rotor and sealings is zero in case of step-by-step movement.

What is claimed:

1. A sorption device for use in a cooling system, an air-conditioning device, a heat pump or the like, said sorption device comprising:

several elongated sorption containers (16) which are filled with sorption substances over part of their length and form a heater absorber zone in said part and whose other part of the length forms a condensation evaporation zone, at least two coaxial housings (11, 12) in which said sorption containers are rotationally arranged in axial parallelism on an orbit and therein are located with the heater absorber part in one housing and the condensation evaporation part in another housing, means for supplying gaseous heat carrier media, air in particular, to the external surfaces of the rotating sorption containers (16) in each of the housings, means (40, 41) for heating the gaseous heat carrier medium in the housing enclosing the heater absorber parts of the sorption containers and axially extending webs (20 to 28') serving for guiding the heat carrier medium, which are provided for in the housings directed radially from outside to inside and vice versa and which essentially reach till to the outer and the inner orbit of the sorption containers (16) and are mutually shifted externally and internally, wherein said webs (20 to 28') which are passed by the sorption containers continuously, are arranged on axially extending fixed housing parts (19, 37) of said coaxial housings (11, 12) and carry lips (36) sealing the gap between the web and the respectively neighboring sorption container (16) against passage of the gaseous heat carrier medium.

2. A sorption device for use in a cooling system, an air-conditioning device, a heat pump or the like, said sorption device comprising:

several elongated sorption containers (16) which are filled with sorption substances over part of their length and form a heater absorber zone in said part and whose other part of the length forms a condensation evaporation zone, at least two coaxial housings (11, 12) in which said sorption containers are rotationally arranged in axial parallelism on an orbit and therein are located with the heater absorber part in one housing and the condensation evaporation part in another housing, means for supplying gaseous heat carrier media, air in particular, to the external surfaces of the rotating sorption containers (16) in each of the housings, means (40, 41) for heating the gaseous heat carrier medium in the housing enclosing the heater absorber parts of the sorption containers and axially extending webs (20 to 28') serving for guiding the heat carrier medium, which are provided for in the housings directed radially from outside to inside and vice versa and which essentially reach till to the outer and the inner orbit of the sorption containers (16) and are mutually shifted externally and internally, wherein said webs (20 to 28') which are passed by the sorption containers step by step, are arranged on axially extending fixed housing parts (19, 37) of said coaxial housings (11, 12) and carry lips (36) sealing the gap between the web and the respectively neighboring sorption container (16) against passage of the gaseous heat carrier medium.

3. A sorption device for use in a cooling system, an air-conditioning device, a heat pump or the like, said sorption device comprising:

several elongated sorption containers (16) which are filled with sorption substances over part of their length and form a heater absorber zone in said part and whose other part of the length forms a condensation evaporation zone, at least two coaxial housings (11, 12) in which said sorption containers are rotationally arranged in axial parallelism on an orbit and therein are located with the heater absorber part in one housing and the condensation evaporation part in another housing, means for supplying gaseous heat carrier media, air in particular, to the external surfaces of the rotating sorption containers (16) in each of the housings, means (40, 41) for heating the gaseous heat carrier medium in the housing enclosing the heater absorber parts of the sorption containers and axially extending webs (20 to 28') serving for guiding the heat carrier medium, which are provided for in the housings directed radially from outside to inside and vice versa and which essentially reach till to the outer and the inner orbit of the sorption containers (16) and are mutually shifted externally and internally, wherein said webs (20 to 28') are arranged on an outer and an inner ring (37', 19') respectively coaxially disposed with respect to the common axis of rotation of the sorption containers, wherein said rings in limited manner are rotationally movable such that they accompany the rotation of the sorption containers (16) and rotate in backward direction after a distance corresponding to the circumferential distance between two sorption containers, and that the webs carry lips (36') sealing the gap between the web and the respectively neighboring sorption container (16) against passage of the gaseous heat carrier medium, such that the lip comes to bear on the respectively subsequent sorption container upon rearward rotation of the rings.

4. A sorption device as defined in claims 1 or 2, wherein at least the webs (20 to 24) directed radially from outside to inside are formed as elastically resilient lips (36, 36') or carry such lips.

5. A sorption means as defined in any of claims 1–3, wherein said lips (36, 36') are directed radially from outside to inside as well as radially from inside to outside.

6. A sorption means as defined in any of claims 1–3, wherein said lips are radially movably supported in housing parts (19, 19', 37, 37', 50).

7. A sorption means as defined in claim 6, wherein said lips are adjustable mechanically, by cam control in particular, and/or pneumatically, by means of a pressure hose (52) in particular, and/or electromagnetically.

8. A sorption means as defined in any of claims 1–3, wherein said lips are formed by inflatable elastic tubular sealings themselves.

9. A sorption means as defined in any of claims 1–3, wherein said lips in case of step-by-step movement of the rotating sorption containers in the standstill phase are correlated to limiting walls of the rotor.

10. A sorption means as defined in claim 9, wherein said limiting walls of the rotor are separating walls (33) between the sorption containers (16).

11. A sorption means as defined in claim 9, wherein said limiting walls of the rotor (50) are formed by the sorption containers (49) themselves.

12. A sorption means as defined in any of claims 1–3, wherein said sorption containers (16) are formed as tubes (30) closed on both ends, which carry radially aligned flat ribs (31) spaced over its entire length.

13. A sorption means as defined in claim 12, wherein said tubes (30) have a cylindrical cross-section.

14. A sorption means as defined in claim 12, wherein said tubes (30) have an oval cross-section on.

15. A sorption means as defined in any of claims 1–3, wherein each rib has a trapezoidal contour and with at least one edge (32) is adjacent to the ribs (31) of the neighboring sorption containers (16) for forming radially extending flow channels for the gaseous heat carrier medium.

16. A sorption means as defined in any of claims 1–3, wherein one of the edges (32) radially extending with respect to the common axis of rotation of the sorption containers, of said ribs (31) is bent by 90° for forming a surface part (33) extending in parallel to the long axis of the respective sorption container (16) and lies in a plane radially to the axis of rotation of the sorption containers.

17. A sorption means as defined in any of claims 1–3, wherein said bent surface part (33) of a rib (31) reaches until the neighboring rib of the same sorption container and joins the bent edge (32) thereof.

18. A sorption means as defined in any of claims 1–3, wherein the edges of the ribs (31) located in circumferential direction to the common axis of rotation of the sorption containers (16) are rounded with the radius of said axis of rotation.

19. A sorption means as defined in any of claims 1–3, wherein said tubes (30) of the sorption containers (16) all are built extending in longitudinal direction and comprise a heater absorber part (16a) in the region of one end and a condensation evaporation part (16b) in the region of the other end, which move on an orbit in one housing (11, 12) respectively.

20. A sorption means as defined in any of claims 1–3, wherein the sorption substances contained in the heater absorber parts of the sorption containers (16) are zeolite and water.

21. A sorption means as defined in any of claims 1–3, wherein said tubes (30) are arranged one beside the next on several circles, three concentric circles in particular, and thus move on orbits with different radii.

22. A sorption means as defined in any of claims 1–3, wherein said heater absorber parts (16a) and said condensation evaporation parts (16b) of said mutually concentrically arranged circles of the tubes (30) are filled with different salts.

23. A sorption means as defined in any of claims 1–3, wherein said heater absorber parts (16a) and said condensation evaporation parts (16b) of said mutually concentrically arranged circles of the tubes (30) are filled with a mixture of different salts.

24. A sorption means as defined in claim 22, wherein said heater absorber parts (16a) of the outer tube circle are filled with manganous chloride, those of the central tube pipe are filled with strontium chloride and those of the inner tube circle are will with barium chloride.

25. A sorption means as defined in any of claims 1–3, wherein the salt crystals are intercalated into a basic material, a graphite material in particular.

26. A sorption means as defined in any of claims 1–3, wherein said heater absorber parts (16a) located one beside the next on a circle are filled with different salts.

27. A sorption means as defined in claim 26, wherein said heater absorber parts (16a) subsequently are filled with manganous chloride, strontium chloride and barium chloride and that the tube group is movable around the rotor axis step by step.

28. A sorption means as defined in any of claims 1–3, wherein said housings (11, 12) and the common axis of rotation of the sorption containers are arranged vertically or inclined with respect to vertical, that the housing (12) enclosing the heater absorber parts is located below the housing (11) enclosing the condensation evaporation parts and that the means for heating the gaseous heat carrier medium consists of a heating tube (40) arranged in parallel to the sorption containers (16) externally of the circle of rotation thereof and is heated by a hot medium.

29. A sorption means as defined in claim 28, wherein said heating tube (40) is provided with outer ribs (51) extending in parallel to the direction of circulation of the sorption containers, through which ribs the heat of the heating tube is transferred to the heat carrier medium flowing in the housing.

30. A sorption means as defined in one of the preceding claims 28, wherein said heating tube is built as double-walled closed ring cylinder which partly is filled with a heat carrier medium.

31. A sorption means as defined in one of the preceding claims 28, wherein said heating tube is built as cylindrical body (40) cylinder which partly is filled with a heat carrier medium.

32. A sorption means as defined in one of the preceding claims 28, wherein said heat carrier medium is water.

33. A sorption means as defined in any of claims 1–3, wherein outside of the housing an arrangement (43) for heating the circulating heat carrier medium is arranged.

34. A sorption means as defined in claim 30, wherein said medium heating the heating tube (40) is a hot gas passing through said heating tube.

35. A sorption means as defined in claim 31, wherein the medium heating said heating tube is a hot gas flowing around the heating tube (40) on its outside.

36. A sorption means as defined in claim 34, wherein said gas is a combustion gas.

37. A sorption means as defined in any of claims 1–3, wherein adjacent to the outer wall of the housing (12) accommodating the condensation evaporation parts a burner (43) whose combustion gases charge the heating tube with heat is arranged on the free end of said heating tube (40).

38. A sorption means as defined in claim 37, wherein said burner (43) is a gas burner.

39. A sorption means as defined in claim 37, wherein said burner (43) is a burner operated with liquid fuel.

40. A sorption means as defined in claim 39, wherein the exhaust gases of the burner (43) prior to exiting into the atmosphere pass through a heat exchanger (42).

41. A sorption means as defined in claim 34, wherein the gas passing through the heating tube (40) is the waste gas of a IC engine.

42. A sorption means as defined in any of claims 1–3, wherein within the orbiting sorption containers formed by the tube circles at least four cross flow fans (44) distributed over the circumference and serving for generation of a controlled flow or air are provided for.

43. A sorption means as defined in any of claims 1–3, wherein the core (51) located around the axis of rotation, of the sorption device consists of an aluminum alloy and at least partly comprises a heat insulation in the area directed radially to the outside.

44. A sorption means as defined in claim 35, wherein said gas is a combustion gas.

45. A sorption means as defined in claim 35, wherein the gas passing through the heating tube (40) is the waste gas of a IC engine.

\* \* \* \* \*

UNITED STATES PATENT AND TRADEMARK OFFICE
CERTIFICATE OF CORRECTION

PATENT NO. : 5,941,093
DATED : August 24, 1999
INVENTOR(S) : Bengt

It is certified that error appears in the above-indentified patent and that said Letters Patent is hereby corrected as shown below:

Column 4, Line 21, delete "later," and insert --later.--.

Column 2, Line 8, after "thereof", insert --.-- (period).

Column 10, Line 14, Claim 14, delete "on".

Column 10, Line 64, Claim 24, delete "will" and insert --filled--.

Signed and Sealed this

Twenty-eighth Day of March, 2000

Attest:

Q. TODD DICKINSON

*Attesting Officer*  *Commissioner of Patents and Trademarks*